S. J. WOOD.
SEED SOWER.
APPLICATION FILED APR. 29, 1910.
967,096.
Patented Aug. 9, 1910.
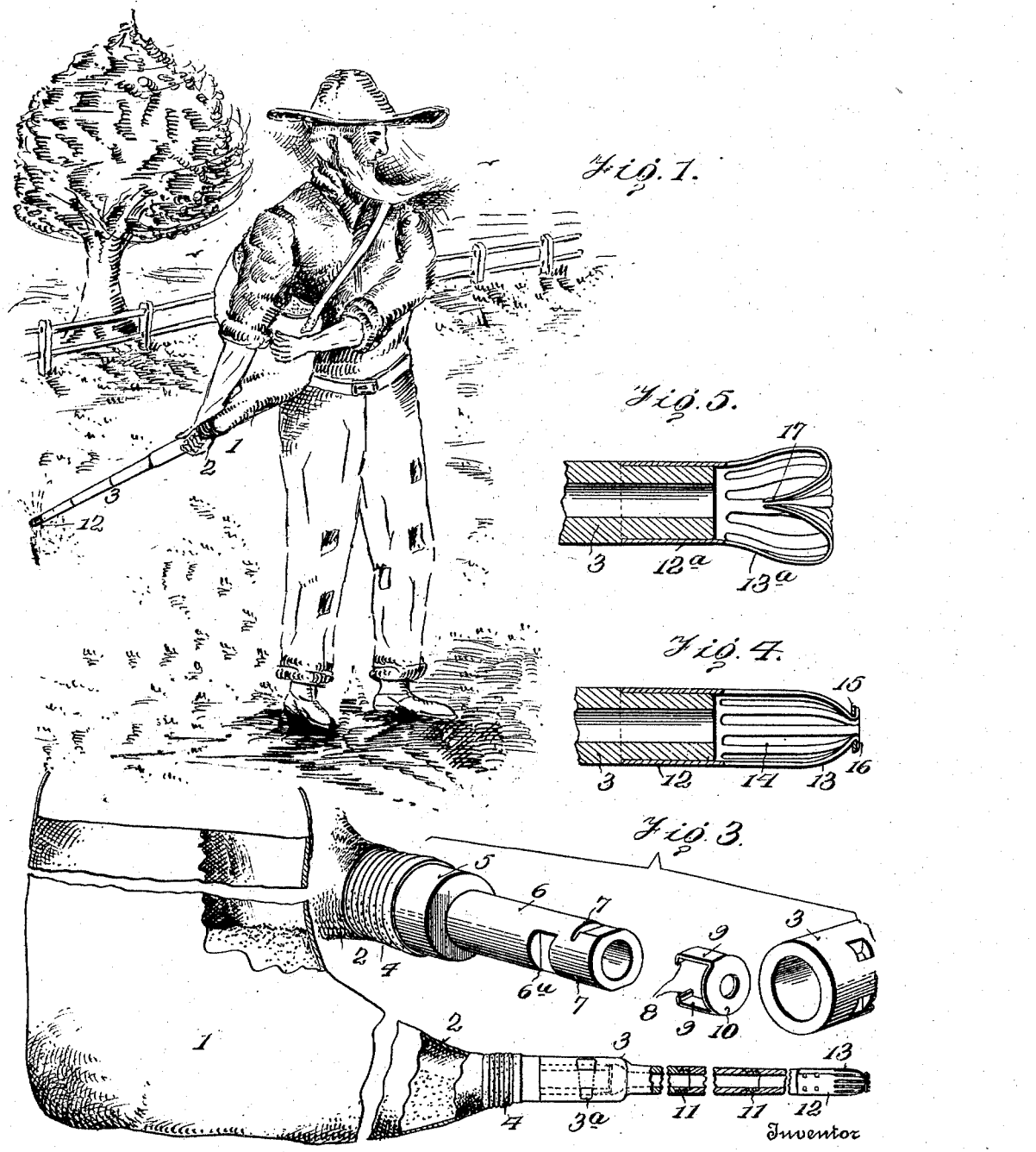

UNITED STATES PATENT OFFICE.

SIDNEY J. WOOD, OF CALIFORNIA, MISSOURI, ASSIGNOR OF ONE-EIGHTH TO COLUMBUS F. ADAMS, OF WHEATLAND, MISSOURI, AND ONE-EIGHTH TO ANDREW J. WOOD, ONE-EIGHTH TO JAMES L. BUCHANAN, AND ONE-EIGHTH TO ROY L. KAY, ALL OF CALIFORNIA, MISSOURI.

SEED-SOWER.

967,096.  Specification of Letters Patent.  Patented Aug. 9, 1910.

Application filed April 29, 1910. Serial No. 558,351.

*To all whom it may concern:*

Be it known that I, SIDNEY J. WOOD, citizen of the United States, residing at California, in the county of Moniteau and State of Missouri, have invented certain new and useful Improvements in Seed-Sowers, of which the following is a specification.

This invention comprehends certain new and useful improvements in devices for sowing grass or other seeds, and the invention has for its object a simple, durable and efficient construction of device of this character which is composed of comparatively few parts that may be easily and cheaply manufactured and readily assembled and disassembled.

The invention also has for an object a seed sowing device capable, by simple adjustment or interchanging of parts, for use in sowing seeds of different sizes. And the invention also aims to generally improve this class of devices and to render them commercially valuable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which;

Figure 1 illustrates the use of my improved seed sower; Fig. 2 is a side elevation of the device, parts being broken out; Fig. 3 illustrates in perspective several of the parts detached and in juxtaposition to each other; and, Figs. 4 and 5 are detail sectional views of two different forms of scatterer.

Corresponding and like parts are referred to in the following description and indicated in all the views of the drawings by the same reference characters.

My improved seed sowing device comprises a sack 1 of canvas or other desired textile fabric, said sack being provided with any form of shoulder strap, whereby the device may be suspended from the shoulders of the operator, the sack being also provided with a reduced and preferably tapering discharge neck 2.

The spout 3 of the sower includes a shank 4 which is provided intermediate of its ends with a collar 5, the discharge neck 2 of the sack being secured upon one end of this shank, as by means of a cord illustrated in the drawing, or by any other equivalent devices. Below the collar 5 the shank 4 is formed with a preferably reduced stem 6 which is formed in its exterior wall with diametrically opposite grooves 7, designed for engagement by the inturned extremities 8 of flanges 9 which are formed on a gaging disk 10 constructed of spring metal or other material or substance. By this means the said disk may be detachably secured to the end of the stem 6 and one disk may be removed and another substituted therefor, according to the particular requirements of the case. These gaging disks, of which there are a plurality with openings therethrough of different diameters, are intended to gage the amount of seed to be sown per acre. The main or body portion of the spout 3 may be of any desired length, preferably tapering from one end to the other and may be constructed in one or more sections. In the present instance, I have shown the body portion of the spout as constructed in three sections connected together by threaded joints, as indicated at 11. The main or body portion of the spout is slipped over the stem 6 and is detachably secured thereto by a key 3ª which is designed to be slipped into the slots formed in the spout and into a recess 6ª formed in the exterior wall of the stem 6.

12 designates one form of seed scatterer which is designed to be secured in any desired way to the discharge end of the spout 3, said scattering device in that form of the invention illustrated in Fig. 4 embodying a thimble which is adapted to be slipped over and frictionally engage the lower end of the spout, said scattering device also embodying any desired number of fingers 13 which provide longitudinal slots 14 and which have their ends converging, as shown, and preferably secured to a ring 15, as by turning the extremities 16 of the fingers outwardly or inwardly and binding or engaging them upon the ring. This construction and arrangement of parts provides a bottom opening for the seed as well as the openings formed by the spaced fingers 13.

From the foregoing description in connection with the accompanying drawing, the operation of my improved seed sower will be apparent.

In the practical use of the device, the sack 1 is suspended from the shoulders of the operator, and the discharge spout 3 is manipulated by one hand and swung laterally back and forth so as to scatter the seed in an evident manner. Obviously, in this back and forth movement of the spout, there will be an instant at the end of each stroke when the spout is practically stationary, and for this reason the opening which is formed by the ring 15 is provided, the seed dropping out through said opening at such instant, but at other times in the operation of the device being discharged through the slots 14.

It is to be understood that my invention is not limited to the exact form of scattering device 12 which is illustrated in Fig. 4, but that changes may be made therein and in the construction, arrangement and proportions of the other parts of the apparatus, without departing from the scope of the invention, as defined in the appended claims. For instance, as illustrated in Fig. 5, I may use a seed scatterer such as indicated at 12$^a$, the same embodying a thimble to be slipped over the discharge end of the spout 3, so as to be frictionally or otherwise held thereon and also embodying spaced fingers 13$^a$ which are not connected to a ring, such as 15, but which are turned inwardly upon themselves, converging at their free extremities and practically meeting at a point, as indicated at 17. This form of seed scattering device may be applied to scatter large seed, such as cane seed or the like, or either form of scatterer may be used with seeds of different sizes, according to the width of the slots or space formed between the fingers.

Having thus described the invention, what is claimed as new is:

1. A device of the character described, comprising a sack, a spout connected to the sack, and a scattering device connected to the discharge end of the spout and embodying a series of laterally spaced fingers, and a ring connected to the fingers at one end, for the purpose specified.

2. A device of the character described, comprising a sack, a spout connected to the sack, and a scattering device secured to the discharge end of the spout and embodying a series of laterally spaced fingers, and a ring, the ends of the fingers being clenched upon the ring.

3. A device of the character described, comprising a sack, a spout connected thereto and constructed in sections, one of which is formed with a stem over which the other section fits, the stem being formed in its exterior wall with grooves, and a gaging disk applied to the end of said section and provided with flanges formed with inturned extremities adapted to be seated in said grooves.

4. A device of the character described, comprising a sack provided with a reduced discharge neck, a spout embodying a shank to which the neck is secured, the shank being provided with a reduced stem and the main portion of the spout fitting over said stem and connected thereto, and a gaging disk secured to the end of said stem.

In testimony whereof, I affix my signature in presence of two witnesses.

SIDNEY J. WOOD. [L. S.]

Witnesses:
Roy L. Kay,
W. R. Lusk.